Beckwith & Graham,
Handle.

No. 107,855.  Patented Oct. 4, 1870.

Witnesses.
Wm. J. Dodge
Samuel Duncan

Inventors.
A. C. Beckwith
G. H. Graham
per F. A. Morley
Atty.

United States Patent Office.

ALVIN C. BECKWITH AND GEORGE H. GRAHAM, OF ORISKANY, NEW YORK.

IMPROVEMENT IN HANDLES FOR MILK-CANS.

Specification forming part of Letters Patent No. 107,855, dated October 4, 1870.

*To all whom it may concern:*

Be it known that we, ALVIN C. BECKWITH and GEORGE H. GRAHAM, of Oriskany, in the county of Oneida and State of New York, have invented a new and useful Improvement in Handles for Milk-Cans; and we do hereby declare that the following is a full, clear, and exact description thereof, which will enable others to make and use the same, reference being had to the accompanying drawings, forming a part of this specification, in which—

Figure 1:
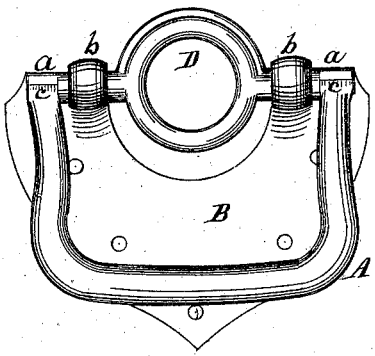
Figure 2:
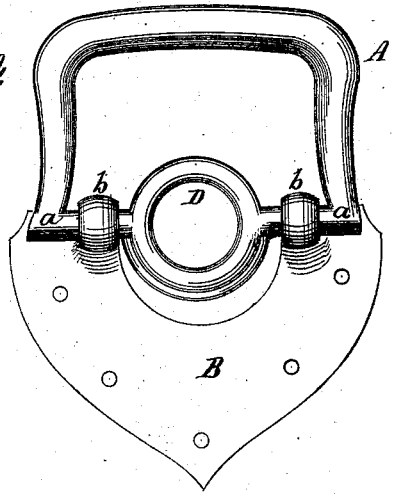
Figure 3:
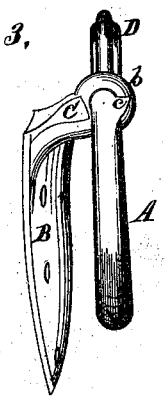

Figure 1 is a front view with the handle in a depressed or closed position. Fig. 2 is a like view with the handle elevated, and Fig. 3 is a side view.

Similar letters of reference indicate like parts in the several figures.

In the accompanying drawings, A is the handle. B is the plate for securing it to the can, and D is the hoisting-eye. The handles are made complete in two parts, and ready for securing to the cans without preparatory fitting or attaching the parts to each other, the handle A being first cast, and the plate afterward cast in connection with it, so that the standards or boxes $b\ b$ of the plate are cast around the axis or shaft $a$ of the handle, and by this means an important saving of labor is made, and the parts are secured to each other in a very permanent and durable manner.

The shaft $a$ of the handle is made smaller where it is to be inclosed by the boxes $b\ b$, to prevent endwise movement of the handle in the boxes. The shaft $a\ a$ is cast with a large hoisting-eye, D, at its center. This eye allows the hoisting-hook to pass entirely through it, so that the most convenient and safe hold of the can is obtained, and at the same time the eye is placed as near to the body of the can as possible, to lessen the liability of the handles being torn from the can. The handle and plate are cast with stops C $c$, Fig. 3, to hold the handle, when in use, at the proper angle from the can. By these means we obtain a substantial and desirable handle at a less cost than ordinarily.

Having thus described our invention, what we claim, and desire to secure by Letters Patent, is—

The plate B $b$ and handle A $c$, with the shaft and hoisting-eye $a$ D, all constructed and arranged as and for the purpose herein described.

The above specification of our invention signed by us this 11th day of August, 1870.

ALVIN C. BECKWITH.
    GEORGE H. GRAHAM.

Witnesses:
  F. A. MORLEY,
  GEO. B. ROWE.